Aug. 14, 1951   P. F. HURST   2,564,602
FLEXIBLE HOSE
Filed Sept. 18, 1948
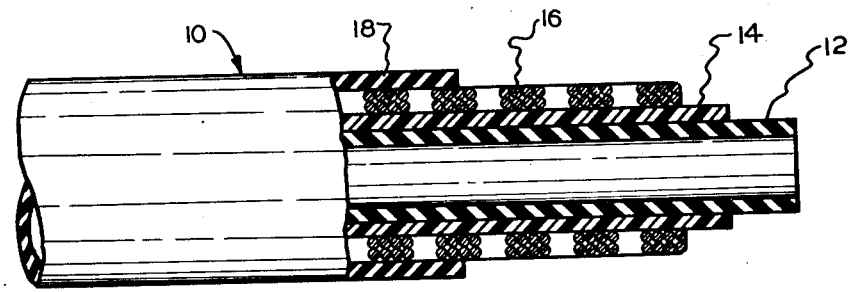
FIG-1-
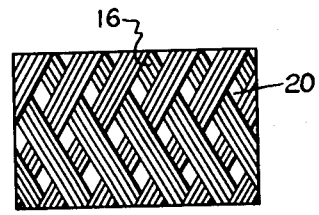
Inventor
PETER F. HURST
By Beauman & Patch

UNITED STATES PATENT OFFICE 2,564,602

FLEXIBLE HOSE

Peter F. Hurst, Jackson, Mich., assignor to Aeroquip Corporation, Jackson, Mich., a corporation of Michigan Application September 18, 1948, Serial No. 49,887

1 Claim. (Cl. 138—56)

This invention relates to flexible hoses of the type employed to convey high pressure fluids and which incorporate a wire braid reinforcement.

In connection with such wire braid flexible hoses, limitations are imposed as to the permissible hose thickness, while the nature of the conveyed fluids requires that the material which forms the interior bore surface should be relatively soft, such surface being normally of rubber or rubber composition which has long elongation and a low yield point. It is for this reason, and in order to give the hose sufficient strength or resistance, while retaining its flexible character, that resort has been had to covering the bore forming hose material with wire braid, usually applied in one or more layers wound about the hose exterior, or embedded within the material thereof as an intermediate layer.

Whether applied as an exterior layer, or embedded within the hose material, it has been proven in practice that the present such hose constructions suffer from the drawback or disadvantage that in use, the high pressure exerted within the hose bore causes the relatively soft material to bite into, or become eroded by, the wire braid and be penetrated or sheared by the latter with the occurring relative movement which takes place between the two (the inner layer and the wire braid) and this to such extent that leakage and failure occurs.

It is an object of the present invention to overcome the above objection to the existing wire braid flexible hose constructions by providing an improved such hose construction in which the interior bore forming and relatively soft hose material is protected against penetration or damage by the wire braid, so that leakage and failure on that account cannot occur.

Also, in connection with rubber or rubber-like hose it has been recognized by the present inventor that whereas rubber or rubber-like material is excellent for the attachment of hose end fittings, the material is open to objection that it diffuses the conveyed gases or fluids, such that a re-conditioning or replenishing operation becomes necessary to compensate for the resultant leakage, which becomes quite an important item when, as in refrigeration systems, the gas or fluid involved is relatively costly. Another object of the invention, therefore, is to provide an improved hose construction which is resistant to diffusion of the conveyed fluids to the outer surface of the hose and obviates leakage of the conveyed fluid in such manner.

The obtaining of these objects will be clear from a consideration of the following description of one practical form of the invention with reference to the accompanying drawings in which:

Fig. I is a fragmentary elevational view of a flexible wire braid hose construction in accordance with the invention, with the end portion thereof shown in longitudinal section and the various layers progressively shortened for clearness of illustration and, Fig. II is a plan view of the wire braid covering.

Referring to the drawings, the flexible wire braid hose 10 is shown as being composed of an inside layer 12 of relatively soft rubber or like material enclosed within an outer layer 14 of a relatively hard yet flexible material upon which there is laid the wire braid 16 so that the inside layer 12 is shielded and protected therefrom by this intermediate layer 14, which latter can be applied by extrusion over the inside layer 12 or can be otherwise applied, as by spraying or dipping.

The material of the intermediate layer 14 must possess the property of being flexible so that it does not impair in any way the required flexibility of the hose and yet is resistive to penetration, erosion or damage by the wire braid 16 upon relative movement occurring between the two in the use of the hose. A variety of materials will suggest themselves as suitable to those skilled in the art but mention is made of the thermo-plastic vinyl materials, e. g. polyvinyl alcohol, polyvinyl chloride, polyethylene, or some other equivalent synthetic or resinous thermo-plastic material, including nylon, which has the necessary resistance to damage or abrasion by the wire braid and which has a yield point in excess of the interior rubber layer. Further, and of importance, the formation of the layer 14 of such material renders the same impervious to the effusion of gases or fluid therethrough from the inner layer 12, which being of rubber or rubber-like material is susceptible to the effusion of a proportion of the conveyed gases or fluids therethrough.

If desired the wire braid 16 can be enclosed by an outer layer of rubber or fabric, as indicated at 18, and following upon conventional practice.

The wire braid 16 is normally wound in crisscross fashion as shown in Fig. II with the interstices between the braid being indicated at 20. In practice, the layer 14 is of such a character as to avoid appreciable extrusion, due to internal pressure, of the material of the layer 14 onto the interstices between the wound wire.

Having thus described my invention and without limiting the same to the precise constructional details described, what I claim as novel is:

A flexible hose for high pressure fluid lines, said hose comprising an inner cylindrical tube of soft rubber constituting the interior bore surface of the hose, said inner tube being susceptible to the outward effusion of fluid therethrough from the said bore surface, an intermediate flexible cylindrical sleeve of thermo-plastic vinyl material completely encompassing said inner tube and in intimate contact with the outer surface thereof, and an outer flexible cylindrical covering of wire braid completely encompassing and contacting the exterior surface of said intermediate cylindrical sleeve, the material of said sleeve being characterized by its resistance to shearing by the wire braid upon relative movement between said sleeve and wire braid as well as being impervious to the effusion of fluid therethrough from the inner soft rubber tube, said covering of wire braid having interstices defined between the braid which are imposed upon the outer surface of said sleeve without penetration of said sleeve material into said interstices.

PETER F. HURST.

REFERENCES CITED

The following references are of record in the file of this patent:

UNITED STATES PATENTS

| Number | Name | Date |
|---|---|---|
| 417,796 | Taft | Dec. 24, 1889 |
| 1,726,957 | Hughes | Sept. 3, 1929 |
| 2,053,112 | Schnabel | Sept. 1, 1936 |
| 2,069,891 | MacLachlan | Feb. 9, 1937 |
| 2,430,931 | Hershberger | Nov. 18, 1947 |
| 2,440,965 | Merrill et al. | May 4, 1948 |
| 2,478,939 | Pape | Aug. 16, 1949 |